United States Patent [19]
Svetlik

[11] Patent Number: 5,863,080
[45] Date of Patent: Jan. 26, 1999

[54] BELL AND SPIGOT SLIP-JOINT ASSEMBLY

[75] Inventor: Harvey E. Svetlik, Arlington, Tex.

[73] Assignee: Phillips Petroleum Company, Bartlesville, Okla.

[21] Appl. No.: 877,393

[22] Filed: Jun. 17, 1997

[51] Int. Cl.[6] ................................................ F16L 55/00
[52] U.S. Cl. .................. 285/148.13; 285/368; 285/422; 285/423
[58] Field of Search ........................... 285/368, 148.1 B, 285/374, 423, 337, 422

[56] References Cited

U.S. PATENT DOCUMENTS

| | | | |
|---|---|---|---|
| 3,720,428 | 3/1973 | Zastaway | 285/368 |
| 4,119,335 | 10/1978 | Rieffle et al. | 285/368 X |
| 4,295,668 | 10/1981 | Louthan | 285/148.13 X |
| 4,336,959 | 6/1982 | Roche | 285/368 |
| 4,417,754 | 11/1983 | Yamaji et al. | 285/104 |
| 4,432,571 | 2/1984 | Davis | 285/283 |
| 4,506,919 | 3/1985 | Peting | 285/231 |
| 4,610,471 | 9/1986 | Hulen et al. | 285/368 X |
| 4,867,488 | 9/1989 | Jones | 285/328 |
| 5,037,144 | 8/1991 | Peting et al. | 285/321 |
| 5,174,615 | 12/1992 | Foster et al. | 285/334.2 |
| 5,509,699 | 4/1996 | Himmelberger | 285/374 X |

FOREIGN PATENT DOCUMENTS

| | | | |
|---|---|---|---|
| 745847 | 3/1956 | United Kingdom | 285/423 |

*Primary Examiner*—Dave W. Arola
*Attorney, Agent, or Firm*—Ryan N. Cross

[57] ABSTRACT

A bell and spigot slip-joint assembly comprises: a spigot having an end and a circumferential flange ring integral with the spigot and which radially and outwardly extends from the spigot, the flange ring being spaced from the spigot end to define a spigot end portion extending between the flange ring and the spigot end; a tubular member having an enlarged bell end for receiving therein the spigot end portion; a gasket ring tightly received between the exterior surface of the spigot end portion and the interior surface of the bell end; a first restraint ring positioned around the spigot on the side of the flange ring opposite the spigot end portion and contacting or closely adjacent to the flange ring, the first restraint ring having an inside diameter less than the outside diameter of the flange ring; a second restraint ring positioned around the tubular member contacting or closely adjacent to the bell end and having an inside diameter less than the outside diameter of the bell end; and connecting means for connecting the first restraint ring to the second restraint ring.

7 Claims, 2 Drawing Sheets

BELL AND SPIGOT SLIP-JOINT ASSEMBLY

BACKGROUND OF THE INVENTION

This invention relates to an improved bell and spigot slip-joint assembly.

A bell and spigot slip-joint assembly comprises a spigot extending into the bell end of another tubular member, and a gasket ring tightly and sealingly received between the interior surface of the bell end and the exterior surface of the spigot. Such a joint can separate under pressure.

Heretofore, concrete thrust blocks have been used to prevent separation. However, concrete thrust blocks are expensive and labor intensive to install. An alternative to concrete thrust blocks are rings that circumferentially bite into the spigot by means of knobs or serrations. Such a ring is connected to a restraint ring at the bell. A high density polyethylene spigot can be sensitive to point loads via environmental stress cracking. Environmental stress cracking occurs where local stress is high due to point impingement. High density polyethylene can also slip with respect to the knobbed or serrated ring by means of relaxation creep. Finally, ground water corrosion of the serrations or knobs may cause failure of the ring in restraining the spigot.

SUMMARY OF THE INVENTION

It is, therefore, an object of the invention to provide a bell and spigot slip-joint assembly that requires neither concrete thrust blocks nor a ring with serrations or knobs in order to prevent separation of the joint.

The above object is realized by a bell and spigot slip-joint assembly comprising: a spigot having an end and a circumferential flange ring integral with the spigot and which radially and outwardly extends from the spigot, the flange ring being spaced from the spigot end to define a spigot end portion extending between the flange ring and the spigot end; a tubular member having an enlarged bell end for receiving therein the spigot end portion; a gasket ring tightly received between the exterior surface of the spigot end portion and the interior surface of the bell end; a first restraint ring positioned around the spigot on the side of the flange ring opposite the spigot end portion and contacting or closely adjacent to the flange ring, the first restraint ring having an inside diameter less than the outside diameter of the flange ring; a second restraint ring positioned around the tubular member contacting or closely adjacent to the bell end and having an inside diameter less than the outside diameter of the bell end; and connecting means for connecting the first restraint ring to the second restraint ring.

The bell and spigot slip-joint assembly of the invention avoids the expense and inconvenience associated with concrete thrust blocks. The bell and spigot slip-joint assembly of the invention also avoids the aforementioned problems associated with a restraint ring having serrations or knobs.

DETAILED DESCRIPTION OF THE INVENTION

Figure 1:
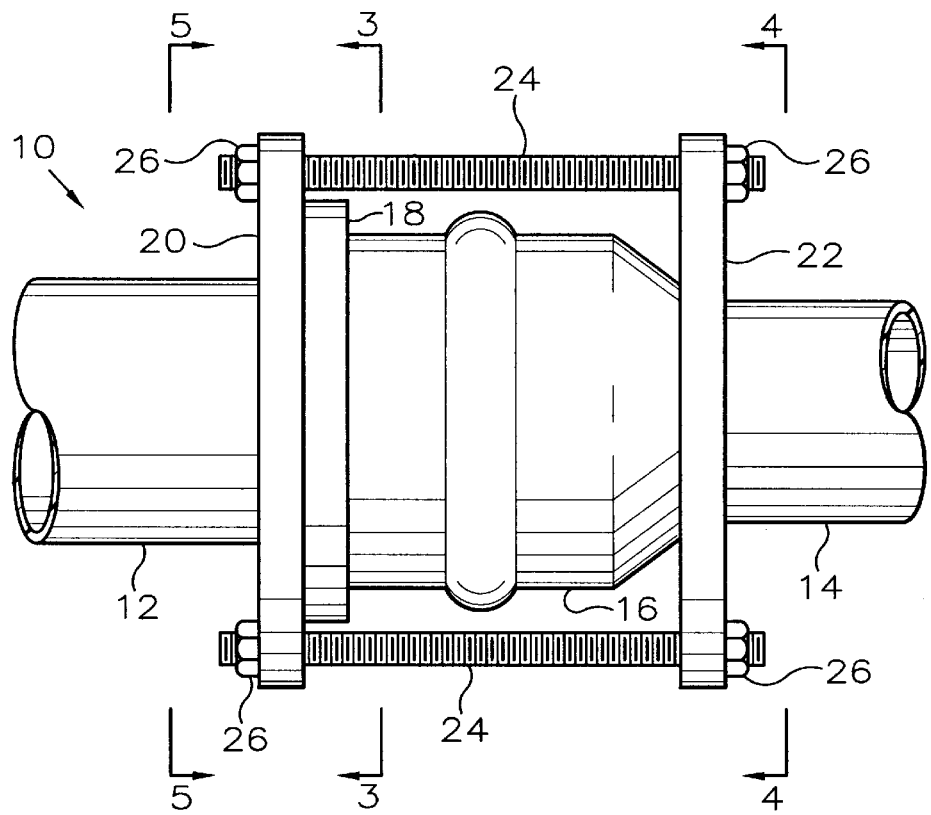
FIG. 1 is a side view of a bell and spigot slip-joint assembly in accordance with the invention.
Figure 2:
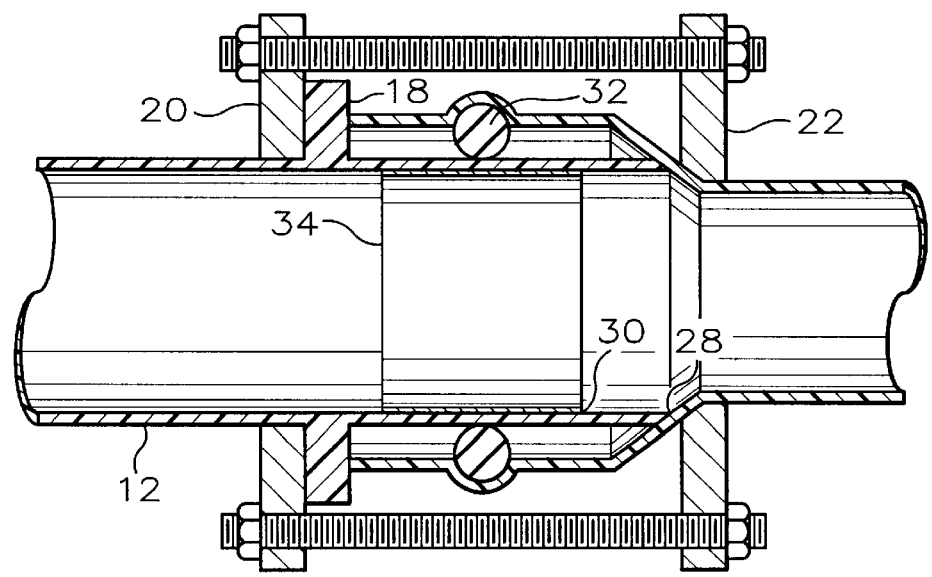
FIG. 2 is a longitudinal cross-sectional view of the assembly of FIG. 1.

Referring to FIG. 1, the illustrated bell and spigot slip-joint assembly 10 includes a spigot 12 and a tubular member 14 having an enlarged bell end 16 for receiving a portion of the spigot therein (as will be more clearly shown in FIG. 2). Spigot 12 has a circumferential flange ring 18 which is integral with the spigot and which radially and outwardly extends from the spigot. Bell end 16 abuts flange ring 18. Restraint ring 20 is positioned around spigot 12, contacting or closely adjacent to flange ring 18. Restraint ring 22 is positioned around tubular member 14, contacting or closely adjacent to the tapered portion of bell end 16. Two threaded rods 24 extend between and through the restraint rings, and nuts 26 are threadedly received on threaded rods 24 to thereby connect restraint ring 20 to restraint ring 22. Nuts 26 are preferably torqued only to hand-tight. Of course, bolts may be substituted for the threaded rods if desired.

Referring to FIG. 2, spigot 12 has an end 28 which is spaced from flange ring 18 to define a spigot end portion 30, within bell end 16, extending between flange ring 18 and spigot end 28. A gasket ring 32 is tightly received between the exterior surface of spigot end portion 30 and the interior surface of bell end 16. Restraint ring 20 can be seen to be on the side of flange ring 18 opposite spigot end portion 30, and to further have an inside diameter less than the outside diameter of flange ring 18. Restraint ring 22 has an inside diameter less than the outside diameter of bell end 16. An optional stiffener ring 34 may be fixedly positioned within spigot end portion 30 by means of a press fit closely adjacent to gasket ring 32. The optional stiffener ring 34 serves to support radial gasket pressure.

Figure 3:
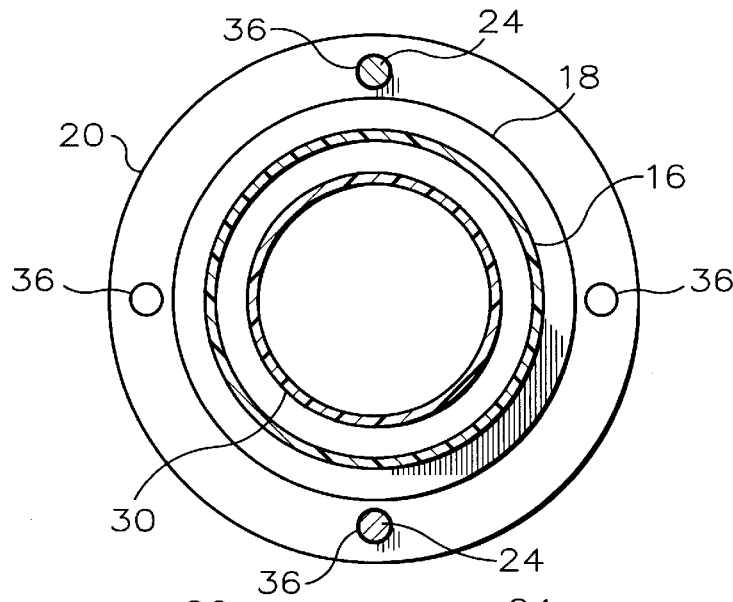
FIG. 3 is a view of the assembly as viewed along line 3—3 in FIG.

Referring to FIG. 3, this view more clearly shows the annular shape of flange ring 18, and further shows that there are only two threaded rods 24 extending through corresponding holes 36 in restraint ring 20. Two threaded rods are usually all that is necessary, but additional holes 36 are provided if it is desired to add two more threaded rods.

Figure 4:
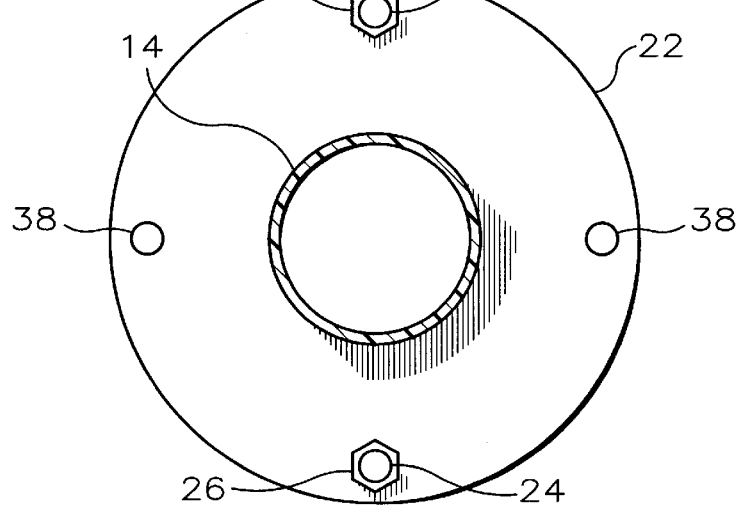
FIG. 4 is a view of the assembly as viewed along line 4—4 in FIG. 1.

Referring to FIG. 4, this view shows the annular shape of restraint ring 22 and holes 38.

Figure 5:
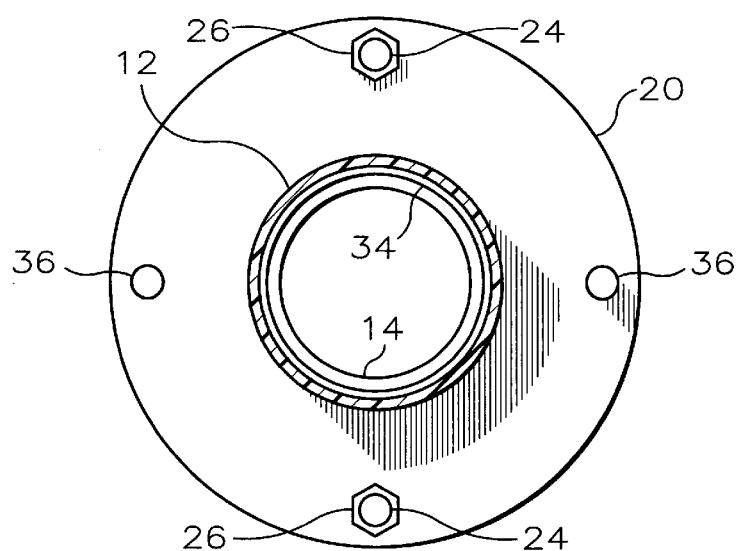
FIG. 5 is a view of the assembly as viewed along line 5—5 in FIG. 1.

Referring to FIG. 5, this view shows the annular shape of restraint ring 20.

With respect to materials of construction, spigot 12 is preferably high density polyethylene. Tubular member 14 is preferably polyvinyl chloride or ductile iron. Each of restraint rings 20 and 22 is preferably ductile iron, although alternative materials include stainless steel, aluminum, and fiberglass. Threaded rods 24 and nuts 26 are preferably a highly corrosion resistant steel. Gasket ring 32 is preferably a suitably resilient material such as synthetic rubber. Stiffener ring 34 is preferably stainless steel.

Obviously, many modifications and variations of the present invention are possible in light of the above teachings. It is, therefore, to be understood that within the scope of the appended claims, the invention may be practiced otherwise than as specifically described.

That which is claimed is:

1. A bell and spigot slip-joint assembly comprising:
    a high density polyethylene spigot having an end and a circumferential flange ring, having an outside diameter, integral with the spigot and which radially and outwardly extends from the spigot, the flange ring being spaced from the spigot end to define a spigot end portion, having an exterior surface, extending between the flange ring and the spigot end;

a tubular member having an enlarged bell end, having a terminal end, an interior surface and an outside diameter, for receiving therein the spigot end portion, wherein the terminal end of the bell end abuts the side of the flange ring nearest the spigot end portion said flange ring having a larger diameter than the diameter of said terminal end of said bell;

a gasket ring tightly received between the exterior surface of the spigot end portion and the interior surface of the bell end;

a first restraint ring positioned around the spigot on the side of the flange ring opposite the spigot end portion and contacting or closely adjacent to the flange ring, the first restraint ring having an inside diameter less than the outside diameter of the flange ring;

a second restraint ring positioned around the tubular member contacting or closely adjacent to the bell end and having an inside diameter less than the outside diameter of the bell end; and connecting means for connecting the first restraint ring to the second restraint ring, having at least two threaded rods extending between the first and second restraint rings and nuts for being threadedly received on the rods.

2. A slip-joint assembly as recited in claim 1 wherein the tubular member is comprised of polyvinyl chloride or ductile iron.

3. A slip-joint assembly as recited in claim 2 wherein each of the first and second restraint rings is comprised of ductile iron.

4. A slip-joint assembly as recited in claim 3 further comprising a stiffener ring fixedly positioned within the spigot end portion closely adjacent to the gasket ring.

5. A slip-joint assembly as recited in claim 1 wherein the spigot end portion abuts a tapered portion of the interior surface of the bell end.

6. A slip-joint assembly as recited in claim 5 wherein the tubular member is comprised of polyvinyl chloride.

7. A slip-joint assembly as recited in claim 6 wherein each of the first and second restraint rings is comprised of ductile iron.

* * * * *